United States Patent Office 3,505,639
Patented Apr. 7, 1970

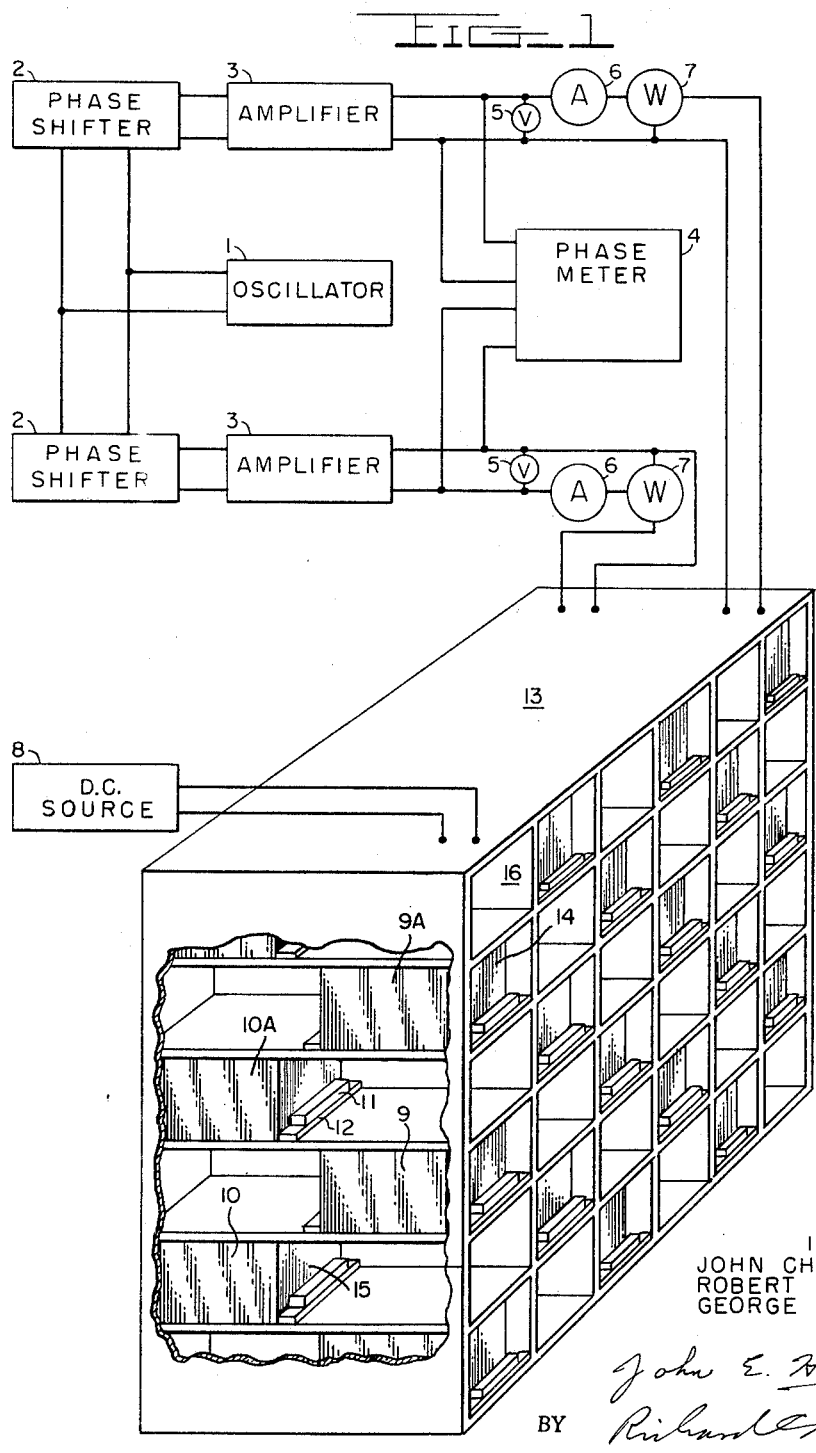

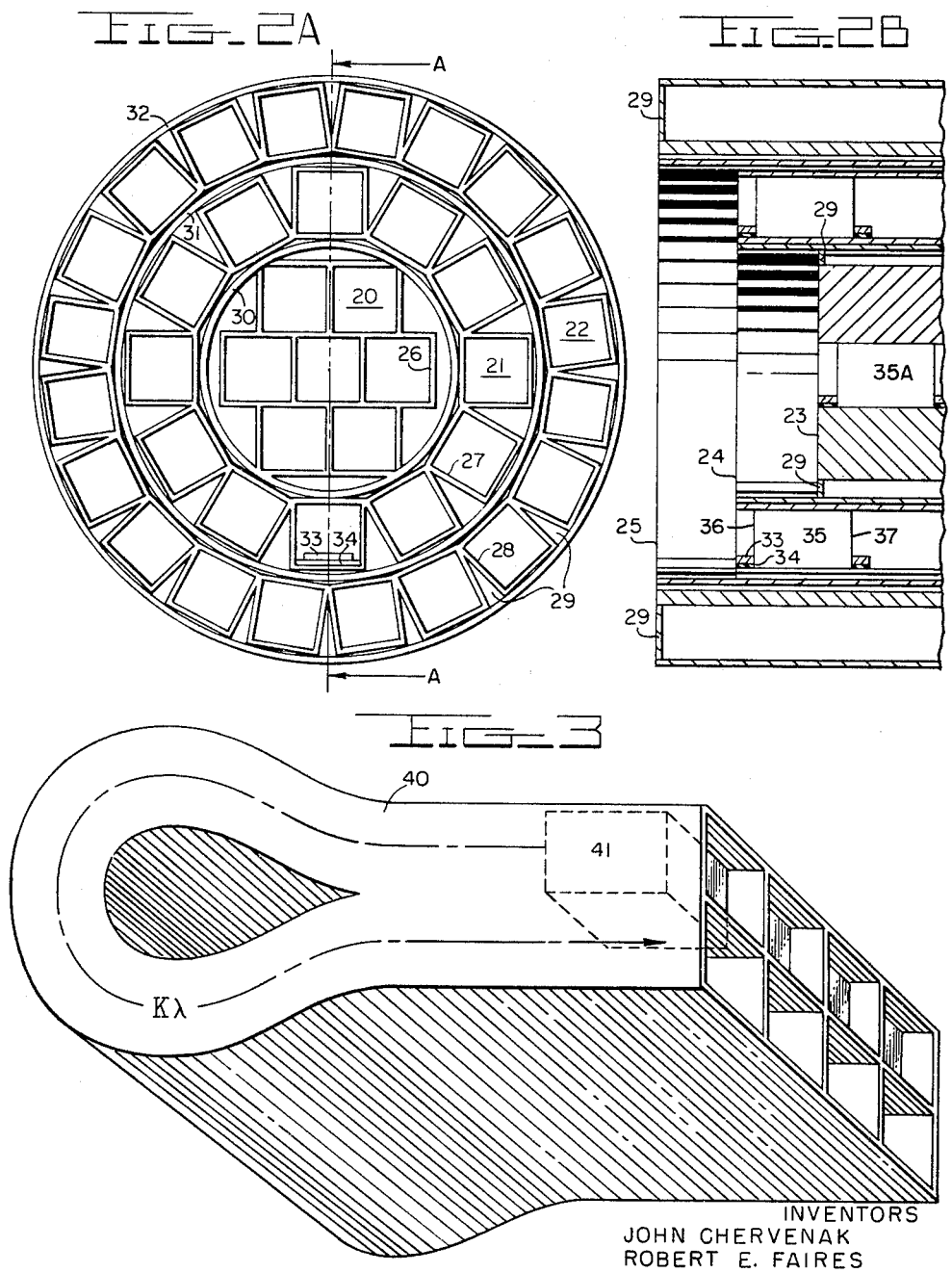

3,505,639
DIRECTIONAL ARRAY STRUCTURES FOR
FREQUENCY TRANSDUCERS
John Chervenak, Oxon Hill, Md., Robert E. Faires,
Washington, D.C., and George Pida, Arlington,
Va., assignors to the United States of America as
represented by the Secretary of the Navy
Filed Mar. 31, 1961, Ser. No. 99,966
Int. Cl. H04r 1/40
U.S. Cl. 340—9      4 Claims

ABSTRACT OF THE DISCLOSURE

An array of transducers are arranged on a common rigid housing. The housing is divided by rigid conduits forming a plurality of compartments in which are positioned the transducers. A massive motor is provided for vibrating the housing as a whole. The individual transducers radiate in two opposite directions but the array is arranged so that it radiates in only one of the two directions.

The invention described herein may be manufactured and used by or for the Government of the United States of America for governmental purposes without the payment of any royalties thereon or therefor.

The present invention relates to the structure of underwater transducer arrays wherein the individual transducers radiate in at least two oppositely directed patterns, whereas the array radiates in only one. More specifically the invention relates to arrays wherein the individual transducers are each surrounded by a rigid housing which vibrates as a unit to insonify a body of water in which it is immersed.

In a copending application by John Chervenak Ser. No. 611,798, filed Sept. 24, 1956, there is disclosed a push-pull type of transducer which is of the type mentioned above and has proved to be very efficient at low frequenecies. The transducer is enclosed in a rigid housing of cubical form which is moved relative to a spring suspended body of comparable mass within the housing by an electromagnetic motor. The housing moves parallel to four of its walls, radiating from the remaining opposed walls.

Since the dimensions of the housing are less than half a wavelength, some means for isolating the antiphased radiations from the two walls to prevent destructive interference was needed. Preferably it was desired to redirect the energy supplied to both radiating walls in the same direction and phase. A number of these units could then be combined in a unidirectional array.

To do this a device known as a squashed tube reflector was placed against one face of the transducers. These tubes are elliptical in cross-section in order to present a greater surface to the transducer. The interior of each tube is filled with gas so as to provide an impedance mismatch between the transducer and the water at one radiating face.

Such an arrangement while operative proved to be unsatisfactory. The use of only one radiating face did not permit the transducer to operate at full efficiency. Also the squashed tubes collapsed at great depths, altering the radiation pattern. The same effect occurred with other reflectors such as Cell-tite rubber. The Handbook of Material Trade Names by Zimmerman and Lavine, published by the Industrial Research Service, Dover, N.H., in 1953, describes Cell-tite as "An ebony-like, cellular rubber material."

An object of the present invention is therefore to provide an array of underwater sound transducers wherein antiphased radiations from opposite sides of each transducer are directed into a single radiation pattern.

A further object of the invention is to provide an array of the type described above which will operate at great depths in water.

These and other objects of the invention will be best understood by reference to the accompanying drawings wherein:

FIG. 1 shows sound transmitting system including one embodiment of a biplanar transducer array according to the present invention;

FIG. 2A shows the front view of a horn shaped array using the multiplanar principle;

FIG. 2B shows a side view in section taken along section line A—A in FIG. 2A; and FIG. 3 shows an array with a reflex coupling structure at each transducer.

In the embodiment of FIG. 1 a variable frequency oscillator 1 is used to generate signals for the array over a preselected frequency band. The signals are then fed to two paths at least one of which contains a phase shifter 2. Since the range of most phase shifters is limited by bandwidth, one or both of these properties is enhanced by using a phase shifter in each path.

From the phase shifters each signal passes through a separate amplifier 3. Suitable audio amplifiers will suffice, and the usual push-pull output transformer may be omitted, however, since this structure is found in the transducers. A phase meter 4 is coupled to the amplifier output, as are suitable voltmeter 5, ammeter 6 and wattmeter 7 to measure the signals supplied. These meters may be omitted if the equipment is sufficiently stable to maintain a preset calibration. A DC current supply 8 furnishes the bias requirements of these particular transducers, however, a permanent magnet type described in copending Application No. 59,453 by George Pida, filed Sept. 9, 1960, may be used which does not require these elements.

The transducers are arrayed in two groups in a checkerboard fashion viewed from the front radiating surface of the array. The transducers such as elements 9 and 9A being in one group, to be called primary transducers are separated by an equal number in the second group to be called secondary transducers 10 and 10A. The primary transducers are aligned with a radiating face 14 in a primary plane and the secondary ones with a similar face 15 in a secondary plane behind the primary plane.

Since the entire housing of each transducer oscillates the array is enclosed in a walled frame 13 having compartments or conduits 16 wherein the transducers are freely slidable. The opposite ends of the compartments or conduits are open to permit radiation. The frame is made from steel or other rigid material capable of channeling radiation from the transducers. A strip of metal 11 mounted on a rubber cushion 12 is placed at each end of the transducers but slightly spaced therefrom so as not to interfere with their oscillation.

The transducers are positioned so that the primary and secondary planes are spaced a quarter wavelength at the center frequency of the oscillator. The phase shifters are adjusted to provide a quarter cycle of relative phase shift so that at the center frequency of the oscillator, radiations from the front faces of the transducers in the primary plane lag those from the transducers in the secondary plane. The radiations from the front faces of all the transducers thus leave the front of the array in phase. Viewed from the rear the radiations from the back faces of the transducers are antiphased and cancel. Substantially the same effect is obtained for frequencies within ¼ of octave the center frequency.

More than two groups of transducers may be employed. In such an array the groups each initiate waves in a different plane, the spacing of the planes as well as the amplitude and phase of the radiations being chosen in accordance with a directivity function. For example when the spacing is a quarterwavelength and the groups differ in phase by a quarter cycle the amplitudes may follow a binomial or Tchebyscheff distribution. Additional signal paths from the oscillator 1 must of course be supplied for the extra groups.

As shown in FIG. 2 the transducers, such as elements 35 and 35A, in each group may be arranged to provide a selected pattern of radiation. In this case the first group 20, consisting of six transducers, are arranged to radiate from a circular area and the second and third groups 21 and 22 from annular surrounding areas. Additional groups may be added to secure as large a structure as desired. With the radiating planes 23, 24 and 25 of the groups displaced in order, as shown, the array resembles a finned horn and with proper phasing produces a similar radiation pattern. The arrays of FIGS. 1 and 2 need not be limited to transducers with square faces. Triangular, round and hexagonal faces are equally suitable. When two transducers of a group are contiguous, as in FIG. 2, they should be bonded together or to a common frame such as the frames 26, 27 and 28. Any space left between the transducers is filled as by placing a rigid plate 29 of the appropriate shape therein at the front and rear faces 36 and 37 and bonding it to the frames or transducers. The shape of the radiating area defined by each group may also be compromised, so that it exactly fits an integral number of transducer faces. The groups are separated by tubular walls 30, 31 and 32. Strips of metal 33 and rubber 34 may be used to secure the transducers as in FIG. 1.

The arrangement of FIG. 2 offers certain efficiency advantages over the arrangement in FIG. 1. The number of relatively slidable surfaces required is reduced. More important the adjacent faces of the transducers provide rigid barriers to the lateral flow of sound energy. A similar arrangement is obtained by placing all of the peripheral transducers of FIG. 1 in the primary group and the remainder in the secondary. While the number of transducers in each group in such arrays are not equal the reduction in leakage through the conduit walls justifies the inbalance.

Another embodiment which harnesses the back radiations is shown in FIG. 3. Each transducer is mounted in a curved or folded rigid conduit 40 the ends of which are located in substantially the same plane and the inner cross-section of which matches the outer dimensions of the transducer. The transducer 41 is located in the conduit so that the sound path $K\lambda$ from the rear radiating face to the plane of the forward radiating face is an odd integral of half wavelengths at the center frequency of the driving oscillator. The open ends of a plurality of conduits may then be interconnected to form a group, and the groups combined into an array in the manner previously discussed.

The dimensions of the conduit may be reduced by employing suitable delay structures therein. Usually these will consist of rigid baffle plates or other suitable obstructions placed across the conduit. Instead of a curved conduit the path may consist of two straight portions with a common wall each closed at one common end and coupled by a port through the common wall near the closed ends.

The materials used to make the compartmentalized frames and conduits of the arrays must be mechanically strong enough to support the transducers, at least in water, and rigid enough to channel the sound energy without significant loss. Steel has been used in some models, but other materials such as aluminum or even plastics may be employed. Since the structure may be freely flooded, they can be used at any depth to which the transducers themselves may be used. Tests indicate that the present transducers will operate to depths of over 8000 feet and pressures of more than 4000 p.s.i. Increasing the transducer wall thickness apparently could improve these figures many times.

Obviously many modifications and variations of the present invention are possible in the light of the above teachings. It is therefore to be understood that within the scope of the appended claims the invention may be practiced otherwise than as specifically described.

What is claimed is:

1. An underwater transducer array comprising:
   a plurality of transducers;
   an oscillator coupled in common to all of said transducers; each of said transducers including a rigid housing surrounding a massive motor means for vibrating said housing as a unit along an axis therethrough; and
   a plurality of rigid, walled conduits with two open ends, said conduits being dimensioned and arranged to closely surround said transducers and permit limited sliding movement along said axis between groups of said transducers while maintaining said axis in a fixed spatial relationship, said transducers being divided into two groups with each transducer having two opposed end faces normal to said axis, the corresponding faces of one group being in the same plane and spaced a quarter wavelength from a plane containing the corresponding faces in said second group.

2. The invention claimed in claim 1 wherein the transducers in said first group alternate with transducers in said second group in directions parallel to said planes.

3. An underwater transducer array comprising:
   a plurality of transducers;
   an oscillator coupled in common to all of said transducers;
   each of said transducers including a rigid housing surrounding a massive motor means for vibrating said housing or a unit along an axis therethrough;
   and, a plurality of rigid walled conduits with two open ends, said conduits being dimensioned and arranged to closely surround said transducers and permit limited sliding movement along said axis between groups of said transducers while maintaining said axis in a fixed spatial relationship;
   said groups comprising a first group of transducers having opposed radiating end surfaces normal to said axis disposed in a generally circular plane area;
   and, at least a second group having similar radiating end surfaces disposed in an annular plane area spaced from said circular area and coaxial therewith.

4. The invention described in claim 3 further including a plurality of groups with radiating ends disposed in coaxial annular areas, the areas increasing in outer diameter and spacing from the circular area.

References Cited

UNITED STATES PATENTS 1,855,147  4/1932  Jones _____ 181—.5

RODNEY D. BENNETT, Jr., Primary Examiner

B. L. RIBANDO, Assistant Examiner